United States Patent Office 2,798,256
Patented July 9, 1957

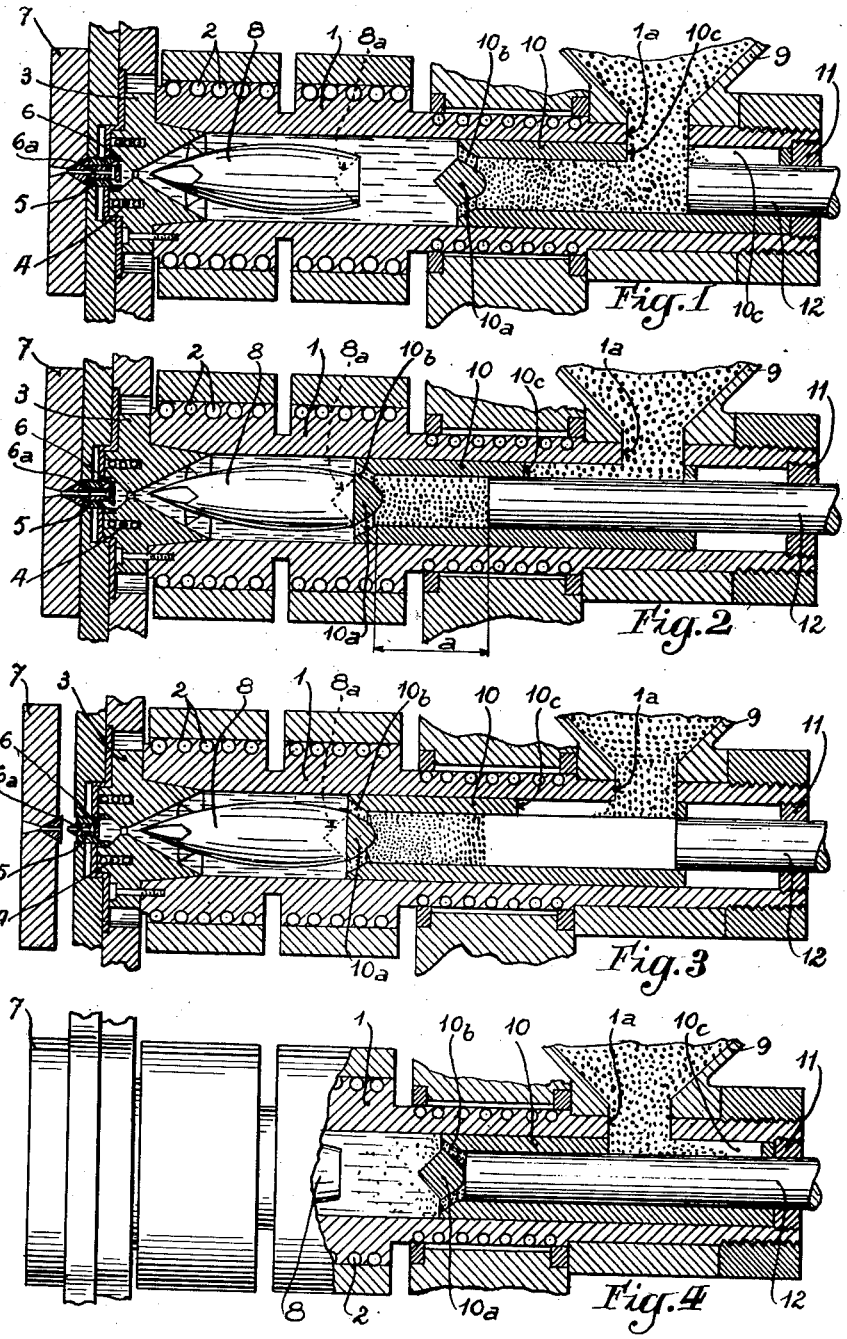

2,798,256

INJECTION MOULDING MACHINES

Elysée Eynard, Lyon, France

Application February 26, 1954, Serial No. 412,903

Claims priority, application France June 2, 1953

5 Claims. (Cl. 18—30)

My invention relates to injection moulding machines for plastic substances.

A conventional injection moulding machine comprises a heating cylinder provided at its end with a discharge nozzle adapted to engage the mould filling nozzle, and a plunger movable in the cylinder. The plastic material is introduced through a lateral aperture which is uncovered by the plunger at the end of its return stroke. This material is then in the form of powder or of granules and it is relatively cold. It is pressed into the bottom of the injection cylinder in the form of a compact mass which acts as a piston forcing into the mould the plastified material which was already in the cylinder, and this compact mass is heated and in turn plastified to be forced into the mould at the next operation of the plunger.

The plunger thus has to overcome the resistance of the plastified material flowing through the discharge nozzle and through the conduits of the mould, and the resistance due to friction of the cold mass of solid material against the wall of the cylinder between the feeding aperture and the bottom of the cylinder. This requires in practice a considerable pressure from the plunger and entails a rapid wear of the parts and a very high power consumption. When the plunger is driven by a hydraulic ram, as it generally occurs, the latter has to be powerful, expensive and therefore cumbersome and relatively slow in operation. The pressure at the end of the injection period rises to very high values, the mould halves have therefore to be particularly strong and the means adapted to lock these halves in the closed position must be provided in consequence. These drawbacks may be reduced by feeding the cylinder with pre-plastified material, but the pre-plastifying devices which have hitherto comprised auxiliary pistons actuated by a separate hydraulic, compressed air or other gear, are cumbersome and expensive.

A first object of this invention is to provide means whereby pre-plastification of the thermoplastic material may be effected without any additional actuating means.

Another object of my invention is an injection machine comprising a tubular piston inserted between the injection plunger and the cylinder wall, the said tubular piston being provided with a lateral aperture through which the powdered or granulated material may pass when the injection plunger is substantially at its rearmost position, while the rearward stroke of the said tubular piston is so limited that the fore end thereof always remain beyond the feeding aperture of the cylinder.

Assuming that the tubular piston and the injection plunger are both at their rearmost positions, the end of the first one is beyond the feeding aperture in the cylinder while the end of the second one is behind this aperture. The powdered or granulated material fed through the said aperture therefore falls into the tubular piston. Supposing that the mould is appropriately positioned against the discharge nozzle of the cylinder head and that this nozzle is open, when the injection is effected, the still cold material is pressed and forms a compact mass which adheres frictionally to the inner wall of the tubular piston. The latter is thus driven forwardly with the plunger and both moving simultaneously will ensure the injection step by forcing into the mould the already plastified material which was in the bottom or head of the cylinder. In the meantime the material charged into the tubular piston will become plastified. When the injection plunger is returned, a void space will be formed within the tubular piston and another charge of material may thus be introduced into the same through the feeding aperture of the cylinder. If now the injection plunger is again operated with the discharge nozzle closed, no plastified material may be forced through the latter and the pressure created within the cylinder therefore will return the tubular piston towards its rearmost position. During this backward movement of the tubular piston all the material contained by the latter will be forced into the cylinder where it will be fully plastified and will thus be in an appropriate condition for being injected into the mould. The injection plunger will then be returned to its rearmost position and the parts will be ready for a new cycle of operation.

With such a method, to each injection step corresponds two feeding steps. During the injection step proper the injection plunger has no compact mass of solid material to force either through the cylinder or through the tubular piston itself and the displacement of such a mass only takes place between the successive injection steps. The pressure which the injection plunger has to exert is therefore considerably reduced with respect to the conventional machines wherein the plunger must at the same time force the plastified material into the mould and displace the solid material through the cylinder. The final pressure in the mould may remain relatively moderate.

The tubular piston preferably comprises a head adapted to bear against an appropriate abutment at the end of the forward stroke of the piston, the said head being provided with perforations for the passage of the material.

In the annexed drawings:

Fig. 1 is a longitudinal section of an injection moulding machine according to the invention, the parts being illustrated at the position corresponding to the beginning of an operative cycle.

Fig. 2 shows the parts at the end of the injection step.

Fig. 3 shows the parts after the first backward stroke of the injection plunger.

Fig. 4 shows the parts after the second forward stroke of the injection plunger.

The machine illustrated comprises an injection cylinder 1 provided with heating devices 2. The fore end of cylinder 1 is closed by a head 3 also provided with heating devices 4. Head 3 supports a discharge nozzle 5 which is normally closed by a valve 6 provided with a stem which projects outwardly in such a manner as to be pushed by the mould 7 when the latter is applied against head 3. Of course the said stem has a passage for the material injected into the mould, such passage being in the form of a T-shaped canal 6a (Figs. 1 and 3) which prevents any material from flowing from the cylinder when the mould is not positioned for the injection step. Within head 3 there is disposed in the known manner a heating torpedo 8. Cylinder 1 is also provided with a feeding aperture 1a to which there is associated a feeding hopper 9, the said aperture being of course disposed near the end of cylinder 1 opposed to head 3.

A free auxiliary tubular piston 10 is slidably disposed with cylinder 1, the said tubular piston carrying at its fore end a conical head 10a the tip of which is adapted to engage a corresponding depression 8a provided at the rear end of the heating torpedo 8, whereby the forward stroke of piston 10 within cylinder 1 is limited. The rearward stroke of the said tubular piston is limited by a ring 11 screwed at the rear end of cylinder 1 as shown.

The conical head 10a has a row of holes 10b adapted to permit the flow of plastified material in the manner explained below.

The wall of piston 10 has a longitudinally elongated aperture 10c of such a length that it ensures free passage of the material between the aperture 1a of cylinder 1 and the inner space of piston 10 for any position of the latter, as indicated in Figs. 1 and 2.

Within the tubular piston 10 there is slidably disposed an injection plunger 12 which passes through the aforedescribed ring 11. The rear end of plunger 12 is attached to a hydraulic ram or like device not shown by means of which the said plunger may be reciprocated within piston 10.

Means are provided to prevent the tubular piston 10 from rotating within cylinder 1. For instance piston 10 may be slidably keyed to cylinder 1.

The machine described operates as follows:

In Fig. 1 the tubular piston 10 and the injection plunger 12 are both at their rearmost position. The head 10a of the tubular piston 10 is still largely in front of the feeding aperture 1a, while its rear end abuts against ring 11. The fore end of the injection plunger 12 is behind aperture 1a. The inner space of the tubular piston 10 in front of the fore end of plunger 12 is filled with still solid or semi-solid powdered or granulated material from hopper 9. The bottom of cylinder 1 in front of the head 10a of piston 10 is filled with already plastified material. The mould 7 is applied against head 3 whereby valve 6 is open.

The injection plunger 12 is then advanced by means of the hydraulic ram or like apparatus, as above explained. The still solid or semi-solid material in the tubular piston 10 is compressed and forms a compact mass which adheres to the inner wall of piston 10. The latter is thus moved forwardly with plunger 12 and both force the already plastified material from the bottom of cylinder 1 into the mould 7 which is thus filled.

The machine is so adjusted that when the mould is filled the tubular piston 10 abuts against the rear end of the heating torpedo 8 (position shown in Fig. 2). It will be remarked that the fore end of the injection plunger 12 is then well behind the head 10a of the tubular piston, the distance a between both parts corresponding to the length of the mass of solid or semi-solid material compressed within piston 10 during the first portion of the stroke of plunger 12.

The mould is then removed, which causes closure of valve 6. The injection plunger 12 is returned backwards, the tubular piston 10 remaining at its foremost position, as indicated in Fig. 3. There is thus formed within piston 10 a void space which is then filled with material from hopper 9 when the feeding aperture 1a is uncovered by plunger 12. The latter is thereafter again advanced. The material just charged into piston 10 is compressed and again forms a compact mass. But since the discharge valve 6 is closed, no plastified material may flow from cylinder 1. Pressure therefore rises within the same and the tubular piston 10 is forced backwards to its rearmost position (Fig. 4). In this return movement the material which was within piston 10 is transferred into cylinder 1 through holes 10b. The machine is so adjusted that when piston 10 reaches its rearmost position, the fore end of plunger 12 substantially contacts the head 10a of the former.

Plunger 12 is then returned backwards to its rearmost position and the operative cycle is thus perfected.

It will be easily appreciated that with such a method of operation the material is fed twice into the machine before each injection step. This ensures perfect mixing of the material and effective pre-plastification of the same. It will be noted in this respect that when the material is transferred from the tubular piston into the cylinder one half of the mass of material thus transferred has already been pre-plastified within the tubular piston which is heated by its contact with the cylinder wall. It would besides be possible to provide heating means associated to the tubular piston, if required. The transfer of the solid or semi-solid material from the annular piston into the cylinder does not take place during the injection step and the injection plunger 12 has not therefore to overcome at the same time the resistance caused by this transfer and the resistance due to the flow of plastified material from the cylinder into the mould. The injection thus only requires a relatively moderate pressure whereby it is possible to mould rapidly a very fluid material. In the case of moulded articles of large surface the force required for locking the mould in the closed position is much lower than with the conventional machines and the mould has not to be particularly strong.

It will besides be observed that the machine described is simple in construction and comprises no auxiliary feeding mechanism such as feed screws, auxiliary plungers with their actuating rams, heated pre-plastification chambers, etc. The only moving part besides the injection plunger itself is the tubular piston which is freely driven by the material itself without any mechanical connection, abutment or the like. It should also be noted that the adjustment of his machine is easy and is no liable to be perturbed in operation. Assuming for instance that during an injection step the volume of plastified material admitted into the cavities, the mould, is incidentally somewhat lower than the volume of material corresponding to the displacement of the injection plunger and of the tubular piston moving in unison as above explained, the tubular piston does not effect its full forward stroke and even returns backwards during the last portion of the forward stroke of the injection plunger, a corresponding portion of the content of the tubular piston being thus transferred into the cylinder. At the next forward stroke of the injection plunger the tubular piston is returned to its rearmost position of Fig. 4.

The machine described may of course be modified within the ambit of the appendent claims. For instance the fore head 10a of the tubular piston 10 may be omitted in some cases. The forward stroke of the same could be limited by any other means than by the heating torpedo 8. The discharge valve 6 is not essential since the mould may itself prevent any flow of plastified material through the discharge nozzle when it has already been filled. In Fig. 3 for instance the mould 7 has been illustrated as spaced from the discharge nozzle 5 and the latter is closed by valve 6. But if the mould, already filled with plastified material during the preceding injection step, had been maintained pressed against the discharge nozzle, it would have prevented by itself any further flow of material from the cylinder and therefore valve 6 could have been omitted.

I claim:

1. In an injection moulding machine for thermoplastic materials, a cylinder having a closed end, an open end and a lateral feeding aperture near its open end; a discharge nozzle at the closed end of said cylinder; means to close said discharge nozzle; a tubular piston freely slidable within said cylinder, said tubular piston having a lateral feeding aperture of such a length as to register with the feeding aperture of said cylinder for all the positions of said tubular piston within said cylinder; means to limit the stroke of said tubular piston within said cylinder; a movable injection plunger slidable within said tubular piston; and means to move said injection plunger.

2. In an injection moulding machine as claimed in claim 1, said tubular piston having a perforated head at its end nearest to the closed end of said cylinder.

3. In an injection moulding machine for thermoplastic materials, a cylinder having a closed end, an open end and a lateral feeding aperture near one of its ends; a head at the other end of said cylinder; a discharge nozzle carried by said head; a heating torpedo disposed within said head; a tubular piston freely slidable within said cylinder, said tubular piston having a lateral feeding aperture of such a length as to register with the feeding aperture of said cylinder for all the positions of said tubular piston within said cylinder; a perforated head at the end of said tubular piston nearest to the head of said cylinder, said head of said tubular piston being adapted to abut against said torpedo to limit the forward stroke of said tubular piston; means to limit the rearward stroke of said tubular piston within said cylinder; a movable injection plunger slidable within said tubular piston; and means to move said injection plunger.

4. In an injection moulding machine as claimed in claim 3, said head of said tubular piston being conical, said heating torpedo having at its rear end a conical recess adapted to engage said conical head, and the holes of said conical head being so arranged as to remain uncovered when said conical head is engaged in said recess.

5. In an injection moulding machine as claimed in claim 3, a valve disposed in said discharge nozzle, said valve having a stem protruding in front of said nozzle to be pushed when a mould is applied against said nozzle.

References Cited in the file of this patent

UNITED STATES PATENTS

| 2,585,112 | Gravesen | Feb. 12, 1952 |
| 2,616,130 | Banz | Nov. 4, 1952 |